United States Patent [19]
Tsotsos et al.

[11] Patent Number: 5,213,027
[45] Date of Patent: May 25, 1993

[54] BARBECUE GRILL ASSEMBLY

[75] Inventors: Thomas A. Tsotsos, Palm Harbor; Robert L. Bundschuh, Miami Lakes, both of Fla.

[73] Assignee: The Alexander Oven Co., Inc., Palm Harbor, Fla.

[21] Appl. No.: 728,601

[22] Filed: Jul. 11, 1991

[51] Int. Cl.$^5$ .................. A47J 37/04; A47J 37/07
[52] U.S. Cl. ........................... 99/339; 99/341; 99/421 H; 99/450; 99/482; 126/25 R; 126/25 A; 126/9 R
[58] Field of Search ............ 99/419, 339, 421 R, 99/341, 421 H, 421 HH, 421 HV, 448, 450, 482; 126/25 R, 9 R, 9 B, 25 A, 4

[56] References Cited

U.S. PATENT DOCUMENTS

| | | | |
|---|---|---|---|
| 2,897,776 | 8/1959 | Black et al. | 99/421 H |
| 2,968,301 | 1/1961 | Cowart | 126/25 A |
| 3,602,131 | 8/1971 | Dadson | 99/421 H |
| 3,848,523 | 11/1974 | Galisz et al. | 99/419 |
| 3,866,527 | 2/1975 | Katris | 99/448 |
| 4,089,258 | 5/1978 | Berger | 99/339 |
| 4,317,441 | 3/1982 | Berg | 126/41 R |
| 4,321,857 | 3/1982 | Best | 99/340 |
| 4,627,410 | 12/1986 | Jung | 126/25 A |
| 4,886,044 | 12/1989 | Best | 99/444 |
| 4,944,282 | 7/1990 | Aguiar et al. | 126/25 R |

FOREIGN PATENT DOCUMENTS 857216  12/1960  United Kingdom ........ 99/421 HV

*Primary Examiner*—Timothy F. Simone
*Attorney, Agent, or Firm*—Charles J. Prescott

[57] ABSTRACT

A barbecue grill assembly including a main cooking chamber, a removable cooking grid positioned within the main chamber above a primary heat source, a frame for supporting the cooking grid and a drawer element connected to and supporting the frame for rollably withdrawing the cooking grid from the main chamber. The assembly also includes an elevator mechanism for raising and lowering the frame and cooking grid without the need to remove any elements from within the main chamber. A rotisserie is also provided removably supported on the frame which facilitates withdrawal of the spit and cooking food held on the spit from the main chamber for attending without the need for handling hot food or spit. An overhead infrared heating element, side grill elements, a warming chamber and other features are also disclosed.

21 Claims, 5 Drawing Sheets

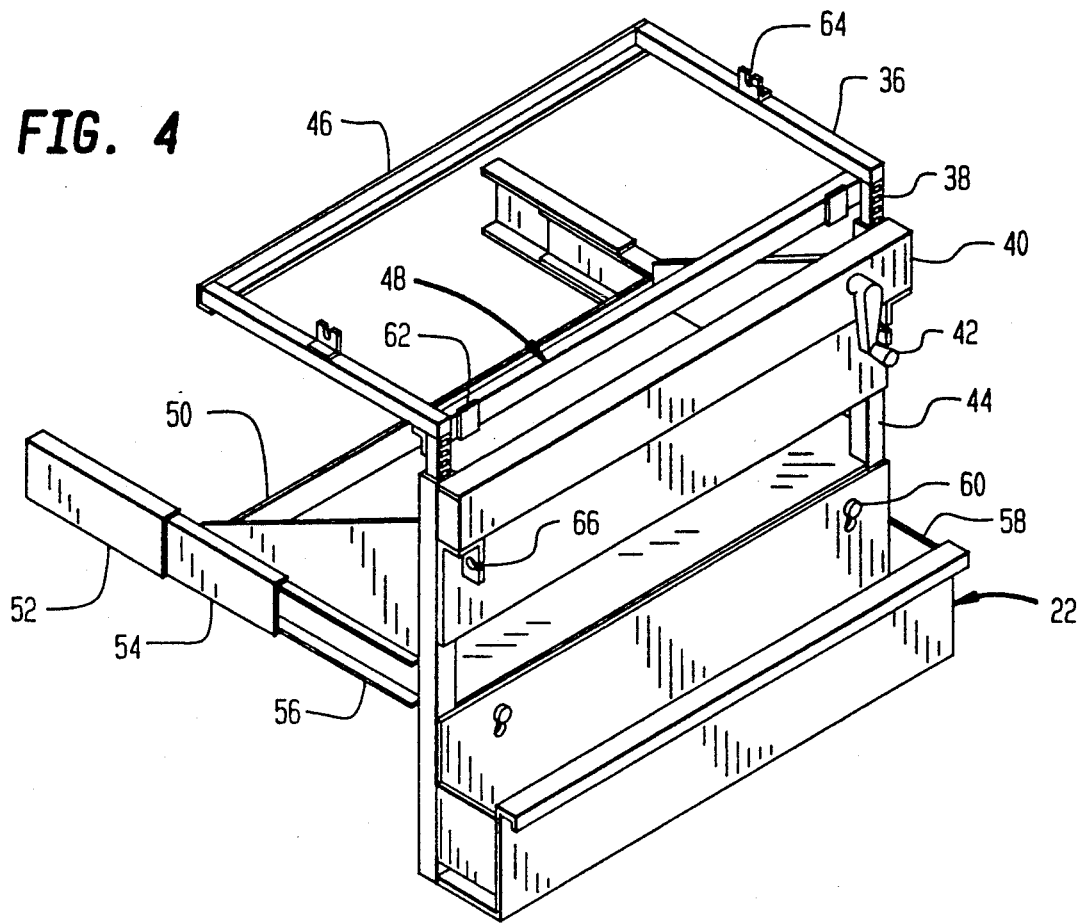
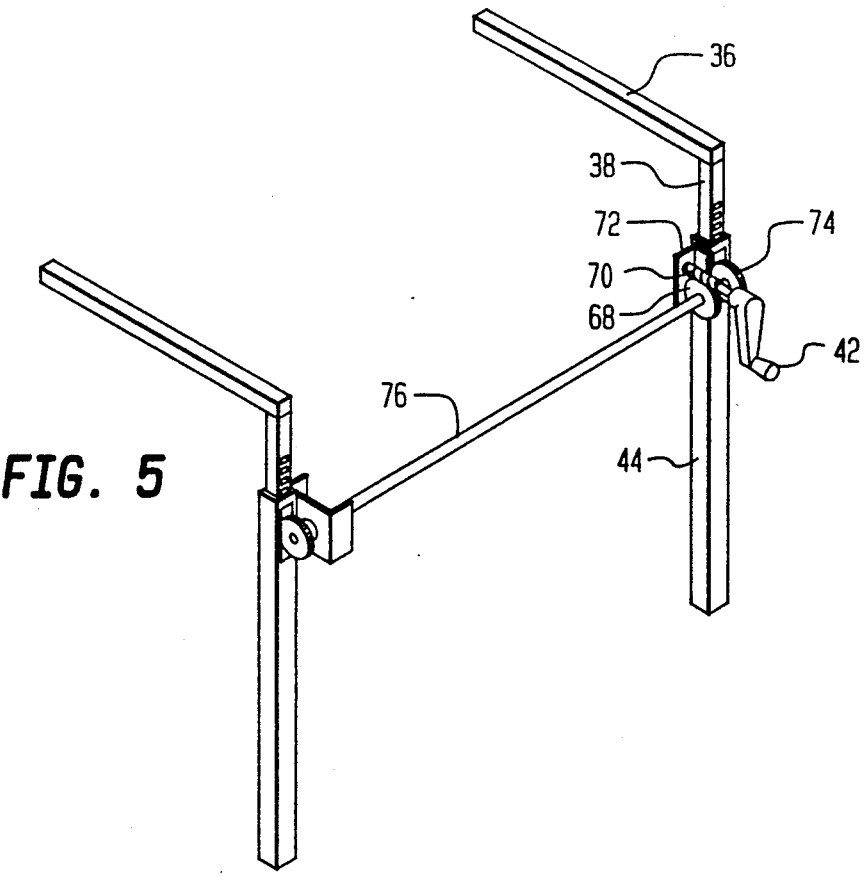

BARBECUE GRILL ASSEMBLY

BACKGROUND OF THE INVENTION

This invention relates generally to cooking devices, and more particularly to a barbecue assembly and rotisserie therefor.

A number of prior art devices are known which includes various features and components in conjunction with barbecuing foods. One such device is disclosed to Best in U.S. Pat. No. 4,321,857 which is directed to an infrared gas grill providing an upper oven and a lower grill area.

The Patent to Hente, U.S. Pat. No. 4,881,519, features an oven with over and under heat sources utilizing a radiant heat.

The invention in U.S. Pat. No. 4,089,258 to Berger teaches a barbecue unit that has two heat sources which facilitate both oven and grill cooking.

A broiler apparatus is taught in U.S. Pat. No. 4,317,441 to Berg which provides a vertical infrared cooking element and means for holding and cooking meat in an upright orientation.

The device in U.S. Pat. No. 4,878,424 invented by Adamson teaches a apparatus having a lower cooking platen and an upper cooking platen, the lower platen including an infrared heater for cooking.

Stewart has invented as described in U.S. Pat. No. RE24,296, an apparatus for infrared cooking which provides for optimal variable positioning of infrared cooking sources contained within trough-shaped upper and lower reflector elements which are hingedly connected one to another.

A barbecue grill is disclosed in U.S. Pat. No. 4,627,410 to Jung includes a variable-sized cooking chamber which adapts to the size of the foods to be cooked.

Best in U.S. Pat. No. 4,886,044 has invented an infrared gas grill which includes an infrared heating element spaced beneath the cooking surface by a plurality of angled baffles.

The present invention provides a barbecue cooking assembly which includes a unique drawer and elevator system allowing the cooking grid to be elevated within the main cooking chamber and/or independently withdrawn in drawer-type fashion to attend to the food being cooked. A unique rotisserie is also provided which allows for periodic attending to the food contained on the rotisserie spit without having to handle either cooking food or rotisserie components within the main cooking chamber of the assembly.

BRIEF SUMMARY OF THE INVENTION

This invention is directed to a barbecue grill assembly including a main cooking chamber, a removable cooking grid positioned within the main chamber above a primary heat source, a frame for supporting the cooking grid and a drawer element connected to and supporting the frame for rollably withdrawing the cooking grid from the main chamber. The assembly also includes an elevator mechanism for raising and lowering the frame and cooking grid without the need to remove any elements from within the main chamber. A rotisserie is also provided removably supported on the frame which facilitates withdrawal of the spit and cooking food held on the spit from the main chamber for attending without the need for handling hot food or spit. An overhead infrared heating element, side grill elements, a warming chamber and other features are also disclosed.

It is therefore an object of this invention to provide a barbecue grill assembly which includes a cooking grid and rotisserie which is conveniently vertically adjustable and may be withdrawn in drawer-type fashion without removing food cooking from atop the cooking grid or rotisserie.

It is another object of this invention to provide a barbecue grill assembly which includes a rotisserie which facilitates periodic withdrawal and examination of the food cooking on a rotatable spit without the need for handling the cooking food or spit.

It is yet another object of this invention to provide additional enhancing features to a barbecue grill assembly, including a warming chamber in conjunction with an overhead infrared secondary heating source and side grill elements which laterally extend in either direction from the main cooking chamber for providing additional cooking surfaces.

In accordance with these and other objects which will become apparent hereinafter, the instant invention will now be described with reference to the accompanying drawings.

BRIEF DESCRIPTION OF THE DRAWINGS

FIG. 4 is a perspective view of the vertically adjustable frame and drawer elements of FIG. 1.

FIG. 5 is a perspective view of the frame and cooking grid elevation assembly.

DETAILED DESCRIPTION OF THE INVENTION

Figure 1:
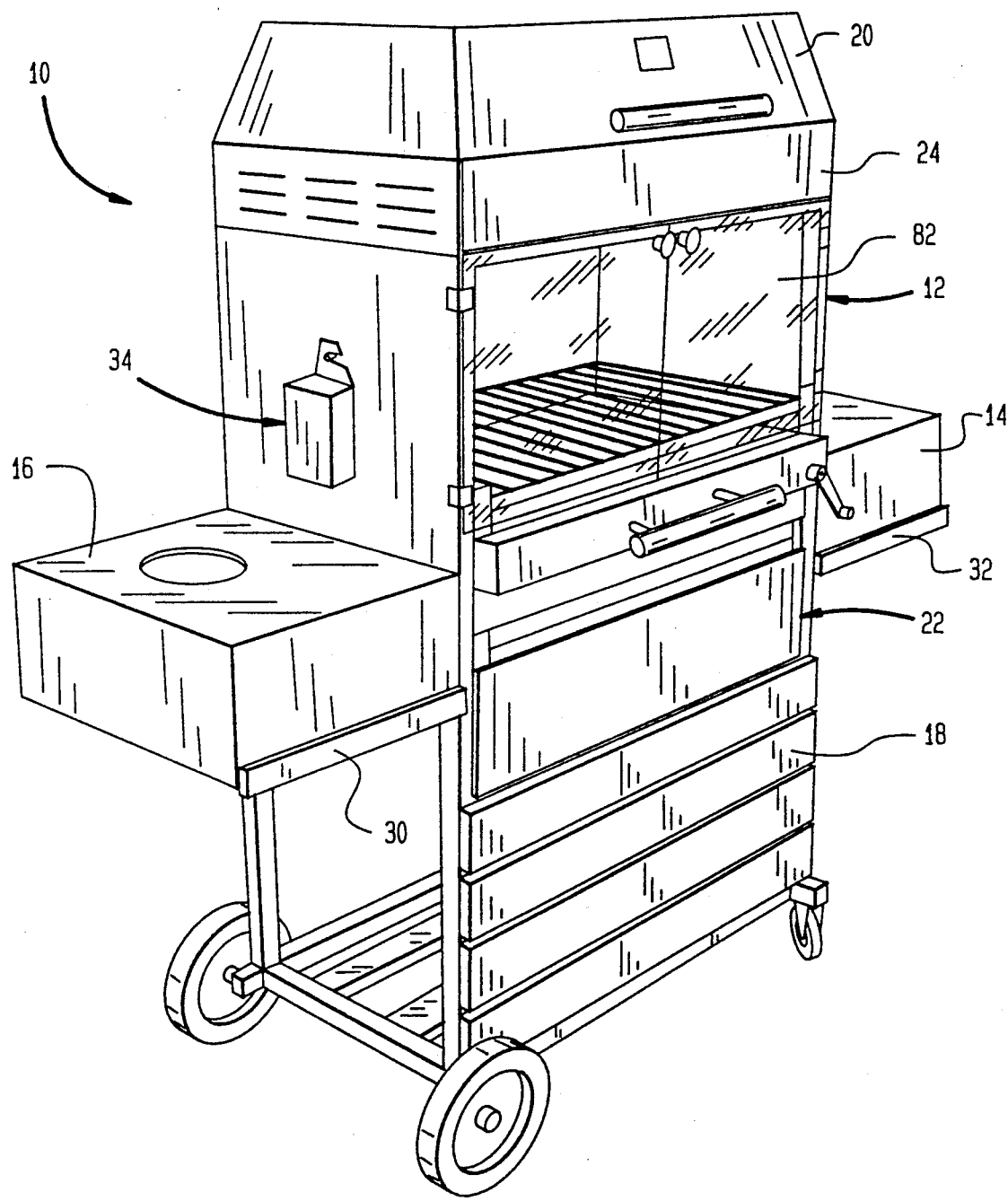
FIG. 1 is a perspective view of the invention in its closed configuration.
Figure 2:
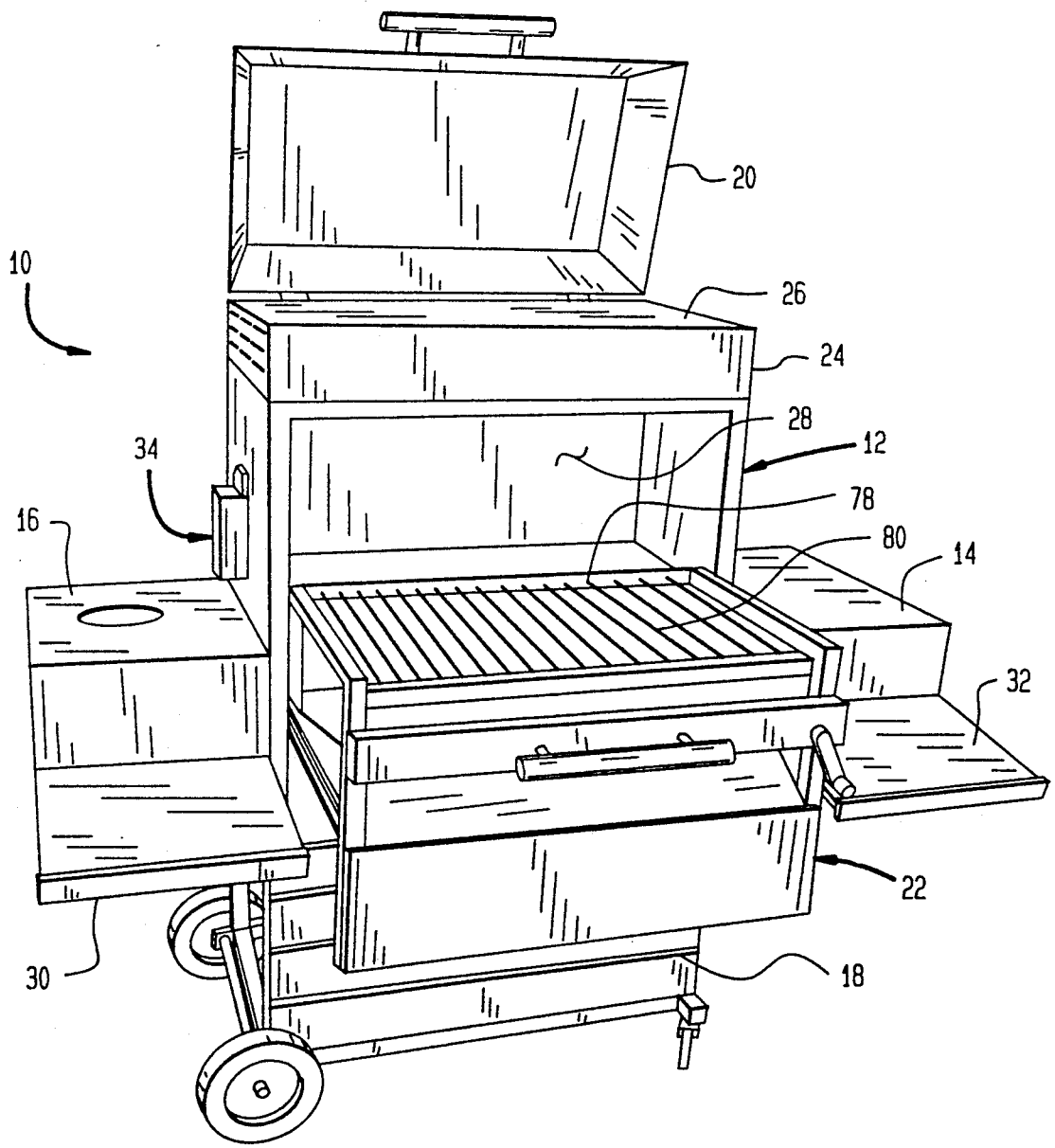
FIG. 2 is a perspective view of FIG. 1 with all features of the invention open.
Figure 3:
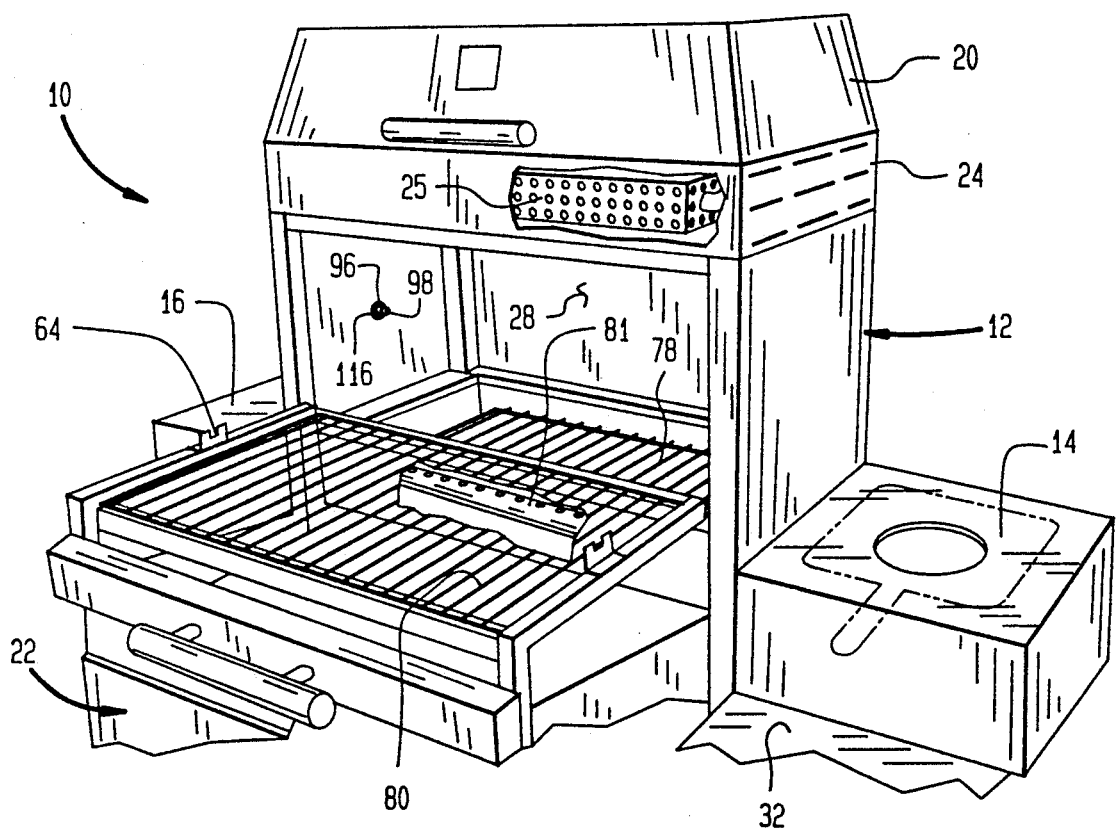
FIG. 3 is an enlarged partially broken perspective view of the upper portion of the invention as shown in FIG. 2.

Referring now to the drawings, and particularly to FIGS. 1, 2 and 3, the preferred embodiment of the invention is shown generally at numeral 10. The barbecue grill assembly 10 includes a main cooking chamber shown generally at numeral 12 defining an interior cooking area 28 and a sliding drawer assembly shown generally at numeral 22. The main cooking chamber 12 is supported atop a lower wheeled housing 18 so that the entire assembly 10 is made portable.

Laterally disposed in either direction from the main cooking chamber 12 are side grill elements 14 and 16 which provide auxiliary horizontal cooking surfaces.

The assembly 10 is preferably powered by a supply of bottled gas (not shown) which provides a supply of combustible gas to a main heat source 81 positioned at the lower portion of main cooking chamber 12 below cooking grid 80 and an upper auxiliary infrared heating element 25 positioned within upper cooking chamber portion 24 as best seen in FIG. 3. Gas is also supplied to gas burners within side heating elements 14 and 16.

Provided within the lower portion of side heating elements 14 and 16 are concealable working surfaces 30 and 32 which extend in drawer fashion when in use.

A warming chamber is also provided formed by the upper surface 26 of main cooking chamber 12 and a dome-shaped lid 20 which is hingedly connected along one margin to surface 26. This warming chamber is heated by infrared heating element 25 and retains sufficient heat radiating therefrom within the warming chamber when lid 20 is closed so as to maintain cooked breads and cooked foods ready for serving.

Referring additionally to FIGS. 4 and 5, the combination pullout drawer and cooking grid elevator assembly is shown generally at numeral 22 and includes a horizontal frame 36 forming a horizontal perimeter support platform atop which a cooking grid 80 may be removably disposed. Upright elongated notched tubular members 38 downwardly extend from the forward end of frame 36, over which support tubes 44 are slidably disposed. Rigidly connected to tubes 44 are brackets 72 on which are mounted a toothed gear 68 which is rotatably driven by the back and forth rotation of handle 42 which actuates worm 70. By this arrangement, a pair of toothed gears 74 interact with the notches in notched members 38 so as to raise and lower frame 36 in response thereto.

Tubular members 44 are rigidly connected as shown in FIG. 4 to a drawer-type assembly having a drawer side element 56, an intermediate slide element 54, and a frame slide element 52 which telescope one to another. The frame slide element 52 is rigidly bolted to an interior upright wall of main cooking chamber 12. Stops 62 properly align the assembly 22 in a closed position against a corresponding mating surface of main cooking chamber 12. By this arrangement, the cooking grid 80 may be both elevated or lowered to adjust cooking speed of food atop the cooking grid 80 and may also be withdrawn from over the main heat source 81 to examine cooking progress or remove foods. Both the elevation and lowering feature and the drawer feature may be independently operated one to another. A removable condiment and spice storage rack 58 which is connectable by mating slots onto pins 60 is also provided whereby a user has access to the contents of the storage rack 58 when standing in front of the grill assembly.

A lava rock grid 78 as best seen in FIG. 3 is also provided positioned intermediate to cooking grid 80 and the main heating element 81.

Figure 6:
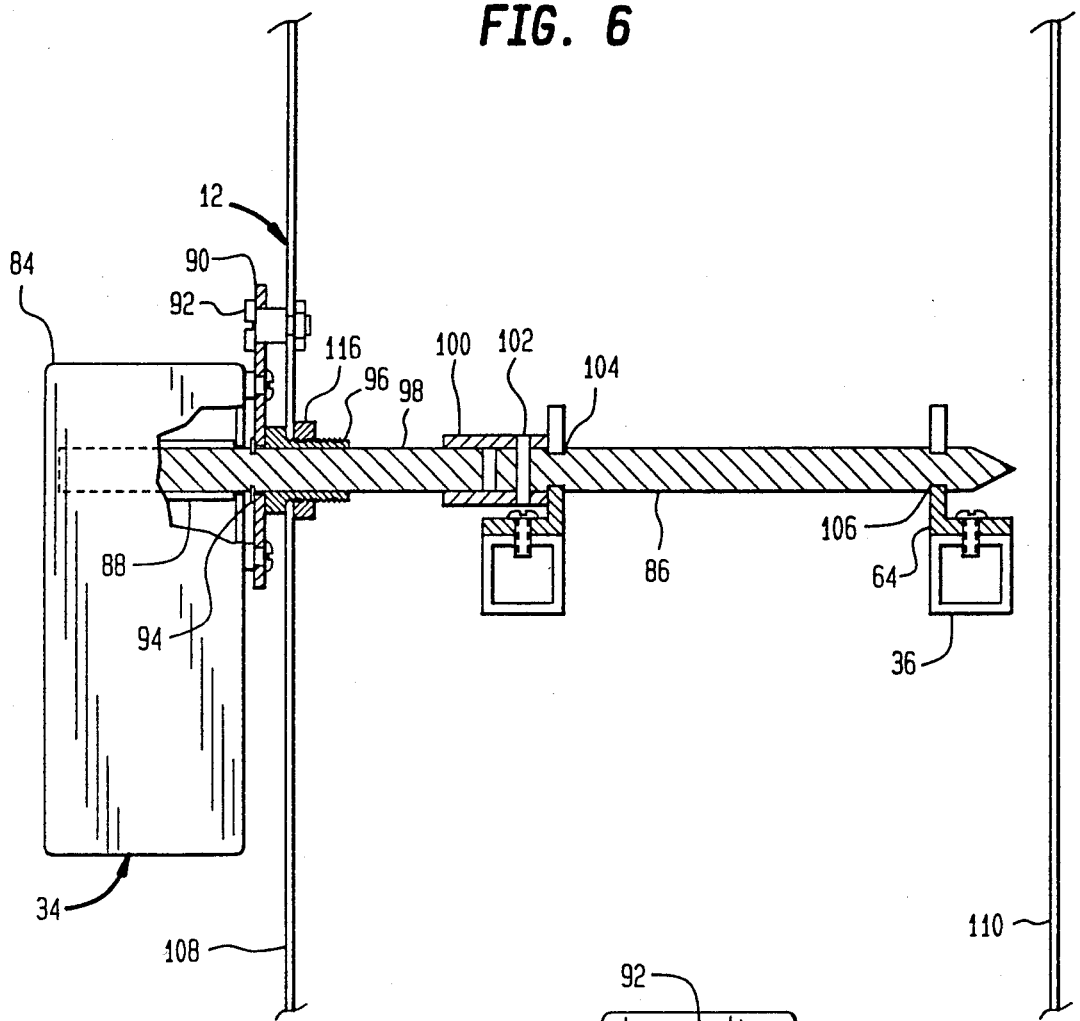
FIG. 6 is a vertical section view of the rotisserie assembly atop the frame within the main cooking chamber.
Figure 7:
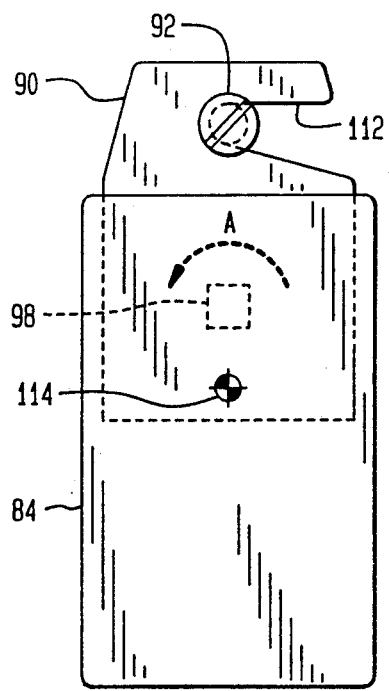
FIG. 7 is a left end elevation view of the rotisserie motor of FIG. 6.

Referring additionally to FIGS. 6 and 7, a rotisserie assembly is shown generally at numeral 34. This rotisserie 34 includes a rotisserie motor 84 which is connected to mounting plate 90 having notch 112 formed therein. A retaining pin 92 is connected to an upright wall 108 of main cooking chamber 12 so that, when the output shaft 98 of motor 84 is fully inserted through bushing 96, the motor 84 may be rotated to an upright position as shown in FIG. 1 so that notch 112 fully engages against pin 92, the center of gravity 114 holding the arrangement thusly. Bushing 96 is held within wall 108 by nut 116.

Output shaft 98 extends a short distance into the interior of main cooking chamber 12, at which point coupling 100, rigidly connected to an elongated spit 86 by pin 102, slidably engages over the distal end of output shaft 98. Output shaft 98 is square-sectioned and matably engages into a similarly configured coupling so as that motor 84 will drivably rotate spit 86 for cooking foods placed thereover. Although square-sectioned, output shaft 98 nonetheless conveniently rotates within the cylindrical aperture in bushing 96.

A pair of upright spit shaft retaining brackets 64 are connected by threaded fasteners atop frame 36 as shown in FIG. 6. These retaining brackets 64 are upwardly notched so as to supportively engage grooves 104 and 106 formed in spit 86. By this arrangement, spit 86 is supported both vertically and laterally and freely rotatable within retaining brackets 64 and yet may be conveniently removed by upward movement.

An important feature of the rotisserie assembly 34 is that spit 86 does not fully extend across to the opposing upright side wall 110 of main cooking chamber 12. Support for the spit 86 is rather obtained atop frame 36 by retaining brackets 64 as previously described. Also as previously described, frame 36 may be rollably withdrawn in drawer-type fashion so as to remove the frame 36 from the main cooking chamber 12. By simply rotating motor 84 in the direction of arrow A in FIG. 7, notch 112 is disengaged from retaining pin 92 and motor 84, along with output shaft 98 may be removed. Spit 86 remains securely positioned and supported within retaining brackets 64 so that the frame 36 may be pulled from the main cooking chamber 12 to attend to the food cooking on spit 86. Reversing this process allows for continued rotisserie cooking of the food. When not in use, spit 86 may be stored in storage brackets 66 as best seen in FIG. 4.

It is noted that only an overhead infrared source of heat may be utilized in the present invention, although not the preferred primary source of heat.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A barbecue grill assembly comprising:
   a main cooking chamber;
   a removable cooking grid disposed within said main cooking chamber above a primary source of heat and structured to supportively receive food for cooking within said main cooking chamber;
   a frame structured to support said cooking grid in a generally horizontal position within said main cooking chamber;
   said frame including an elongated upright notched member structured to cooperatively act with a toothed sprocket which is held for rotation only by a drawer slide element whereby said frame and said cooking grid are movable up and down in response to rotation of said sprocket;
   said drawer slide element connected at one end to said main cooking chamber and at the other end to said sprocket, said drawer slide element structured to allow said cooking grid and said frame to be slidably withdrawn from and returned into said main cooking chamber;
   said sprocket and said drawer slide element operable independently of one another.

2. A barbecue grill assembly as set forth in claim 1, further comprising:
   a rotisserie including a motor having a rotatable output shaft, said motor releasably connectable onto an outer upright wall surface of said main cooking chamber with said output shaft extending through said outer wall into the interior of said main cooking chamber;

an elongated spit releasably coupleable in axial alignment onto a distal end of said output shaft whereby said spit is positioned within the interior of said main cooking chamber;

said spit releasably supported for rotation at each end by a pair of spaced support brackets connected to said frame;

said spit having a length smaller than the width of said main cooking chamber whereby said spit within said support brackets may be withdrawn from said main cooking chamber on said frame after removal of said motor from said outer wall surface.

3. A barbecue grill assembly as set forth in claim 2, further comprising:

an infrared heating unit connected in an upper portion of said main cooking chamber structured to provide a secondary source of heat for cooking food within said main cooking chamber.

4. A barbecue grill assembly as set forth in claim 3, further comprising:

a side grill element extending laterally in either direction from said main cooking chamber;

each said side grill element having a horizontal cooking surface for supporting a food cooking container thereatop.

5. A barbecue grill assembly as set forth in claim 4, further comprising:

a cutting board held within and slidably withdrawable for use from each said side grill element.

6. A barbecue grill assembly as set forth in claim 4, further comprising:

a removable condiment and spice storage rack connected to a front surface of said frame whereby user access to contents of said storage rack is facilitated for the user when standing in front of said grill assembly.

7. A barbecue grill assembly as set forth in claim 4, further comprising:

a warming chamber positioned atop said main cooking chamber and formed by a dome-shaped lid hingedly connected for access along one edge to a corresponding edge of said main cooking chamber.

8. A barbecue grill assembly as set forth in claim 4, further comprising:

a lava rock grid positioned in said main cooking chamber between said primary heat source and said cooking grid for supporting a quantity of heat-absorbing lava rock.

9. A barbecue grill assembly comprising:

a main cooking chamber;

a removable cooking grid disposed within said main cooking chamber above a primary source of heat and structured to supportively receive food for cooking within said main cooking chamber;

a frame structured to support said cooking grid in a generally horizontal position within said main cooking chamber;

a drawer slide element connected at one end to said main cooking chamber and at the other end to said frame, said drawer slide element structured to allow said cooking grid and said frame to be slidably withdrawn from and returned into said main cooking chamber;

a rotisserie including a motor having a rotatable output shaft, said motor releasably connectable onto an outer upright wall surface of said main cooking chamber with said output shaft extending through said outer wall into the interior of said main cooking chamber;

an elongated spit releasably coupleable in axial alignment onto a distal end of said output shaft whereby said spit is positioned within the interior of said main cooking chamber;

said spit releasably supported for rotation at each end by a pair of spaced support brackets connected to said frame;

said spit having a length smaller than the width of said main cooking chamber whereby said spit within said support brackets may be withdrawn from said main cooking chamber on said frame after removal of said motor from said outer wall surface.

10. A barbecue grill assembly as set forth in claim 9, further comprising:

an infrared heating unit connected in an upper portion of said main cooking chamber structured to provide a secondary source of heat for cooking food within said main cooking chamber.

11. A barbecue grill assembly as set forth in claim 10, further comprising:

a side grill element extending laterally in either direction from said main cooking chamber;

each said side grill element having a horizontal cooking surface for supporting a food cooking container thereatop.

12. A barbecue grill assembly as set forth in claim 11, further comprising:

a cutting board held within and slidably withdrawable for use from each said side grill element.

13. A barbecue grill assembly as set forth in claim 11, further comprising:

a removable condiment and spice storage rack connected to a front surface of said frame whereby user access to contents of said storage rack is facilitated for the user when standing in front of said grill assembly.

14. A barbecue grill assembly as set forth in claim 11, further comprising:

a warming chamber positioned atop said main cooking chamber and formed by a dome-shaped lid hingedly connected for access along one edge to a corresponding edge of said main cooking chamber.

15. A barbecue grill assembly as set forth in claim 11, further comprising:

a lava rock grid positioned in said main cooking chamber between said primary heat source and said cooking grid for supporting a quantity of heat-absorbing lava rock.

16. A barbecue grill assembly as set forth in claim 9, further comprising:

elevator means connected between said drawer slide element and said frame for raising and lowering said frame and said cooking grid while said frame and said cooking grid are fully within said main cooking chamber.

17. A barbecue grill assembly comprising:

a main cooking chamber;

a removable cooking grid disposed within said main cooking chamber beneath a primary source of infrared heat and structured to supportively receive food for cooking within said main cooking chamber;

a frame structured to support said cooking grid in a generally horizontal position within said main cooking chamber;

said frame including an elongated upright notched member structured to cooperatively act with a toothed sprocket which is held for rotation only by a drawer slide element whereby said frame and said cooking grid are movable up and down in response to rotation of said sprocket;

said drawer slide element connected at one end to said main cooking chamber and at the other end to said sprocket, said drawer slide element structured to allow said cooking grid and said frame to be slidably withdrawn from and returned into said main cooking chamber;

said sprocket and said drawer slide element operable independently of one another.

18. A barbecue grill assembly as set forth in claim 17, further comprising:

a rotisserie including a motor having a rotatable output shaft, said motor releasably connectable onto an outer upright wall surface of said main cooking chamber with said output shaft extending through said outer wall into the interior of said main cooking chamber;

an elongated spit releasably coupleable in axial alignment onto a distal end of said output shaft whereby said spit is positioned within the interior of said main cooking chamber;

said spit releasably supported for rotation at each end by a pair of spaced support brackets connected to said frame;

said spit having a length smaller than the width of said main cooking chamber whereby said spit within said support brackets may be withdrawn from said main cooking chamber on said frame after removal of said motor from said outer wall surface.

19. A barbecue grill assembly as set forth in claim 17, further comprising:

a warming chamber positioned atop said main cooking chamber and formed by a dome-shaped lid hingedly connected for access along one edge to a corresponding edge of said main cooking chamber.

20. A barbecue grill assembly comprising:

a main cooking chamber;

a removable cooking grid disposed within said main cooking chamber beneath a primary source of infrared heat and structured to supportively receive food for cooking within said main cooking chamber;

a frame structured to support said cooking grid in a generally horizontal position within said main cooking chamber;

a drawer slide element connected at one end to said main cooking chamber and at the other end to said frame, said drawer slide element structured to allow said cooking grid and said frame to be slidably withdrawn from and returned into said main cooking chamber;

a rotisserie including a motor having a rotatable output shaft, said motor releasably connectable onto an outer upright wall surface of said main cooking chamber with said output shaft extending through said outer wall into the interior of said main cooking chamber;

an elongated spit releasably coupleable in axial alignment onto a distal end of said output shaft whereby said spit is positioned within the interior of said main cooking chamber;

said spit releasably supported for rotation at each end by a pair of spaced support brackets connected to said frame;

said spit having a length smaller than the width of said main cooking chamber whereby said spit within said support brackets may be withdrawn from said main cooking chamber on said frame after removal of said motor from said outer wall surface.

21. A barbecue grill assembly as set forth in claim 20, further comprising:

elevator means connected between said drawer slide element and said frame for raising and lowering said frame and said cooking grid while said frame and said cooking grid are fully within said main cooking chamber.

* * * * *